US009453995B2

(12) United States Patent
Clark et al.

(10) Patent No.: US 9,453,995 B2
(45) Date of Patent: Sep. 27, 2016

(54) ELECTRONICALLY VARIABLE ILLUMINATION FILTER FOR MICROSCOPY

(71) Applicants: Lloyd Douglas Clark, San Francisco, CA (US); Brian A. Brown, San Francisco, CA (US)

(72) Inventors: Lloyd Douglas Clark, San Francisco, CA (US); Brian A. Brown, San Francisco, CA (US)

(*) Notice: Subject to any disclaimer, the term of this patent is extended or adjusted under 35 U.S.C. 154(b) by 71 days.

(21) Appl. No.: 14/542,638

(22) Filed: Nov. 16, 2014

(65) Prior Publication Data

US 2015/0185459 A1 Jul. 2, 2015

Related U.S. Application Data

(60) Provisional application No. 61/911,367, filed on Dec. 3, 2013.

(51) Int. Cl.
*G02B 21/06* (2006.01)
*G02B 21/08* (2006.01)
*G02B 21/12* (2006.01)
*G02B 21/14* (2006.01)
*G02B 21/00* (2006.01)

(52) U.S. Cl.
CPC ........... *G02B 21/08* (2013.01); *G02B 21/0088* (2013.01); *G02B 21/125* (2013.01); *G02B 21/14* (2013.01)

(58) Field of Classification Search
CPC combination set(s) only.
See application file for complete search history.

(56) References Cited

U.S. PATENT DOCUMENTS

| 3,920,311 | A | 11/1975 | Tsuda et al. |
| 4,062,619 | A | 12/1977 | Hoffman |
| 4,200,354 | A | 4/1980 | Hoffman |
| 6,243,197 | B1 | 6/2001 | Schalz |
| 6,839,166 | B2 | 1/2005 | Fukushima et al. |

OTHER PUBLICATIONS

Edward Carlo Samson and Carlo Mar Blanca, "Dynamic contrast enhancement in widefield microscopy using prjector-generated illumination patterns", New Journal of Physics, vol. 9, No. 10, 2007.
Applicants, "Diabloc_Brochure", 2014.
Applicants, "Diabloc_User_Guide", 2014.

*Primary Examiner* — Bumsuk Won
*Assistant Examiner* — Balram Parbadia

(57) ABSTRACT

An illumination system for diascopic microscopy comprises a computer (610) with memory (625), a graphics program (605), a display driver (615), and graphical display (600). The display is positioned between a microscope's light source (105, 704) and condenser (110). When activated, the illumination system causes the display to display a predetermined pattern which the light source projects onto the condenser and is then focused by the condenser on a subject (125) to be examined. In conjunction with the microscope's light source, the illumination system emulates the illumination techniques of bright field, dark field, oblique, polarized, monochrome, modulation contrast and phase contrast illuminations.

18 Claims, 6 Drawing Sheets

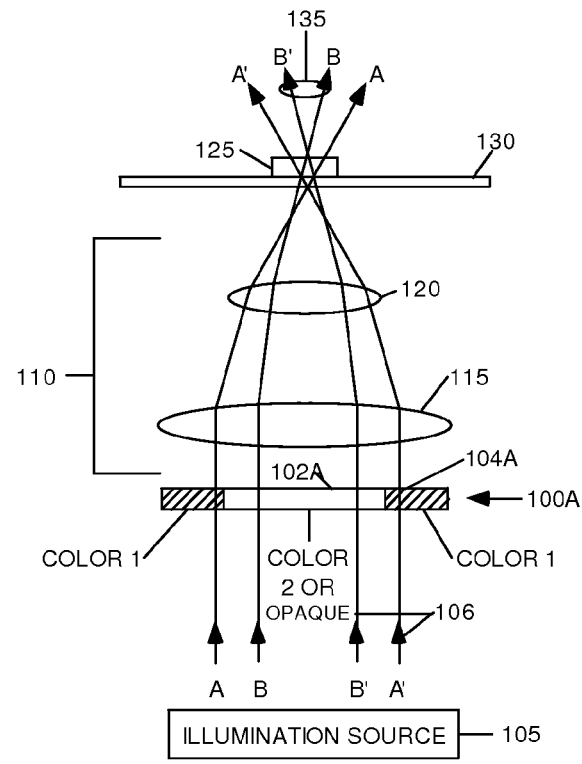
Fig. 1--PRIOR ART
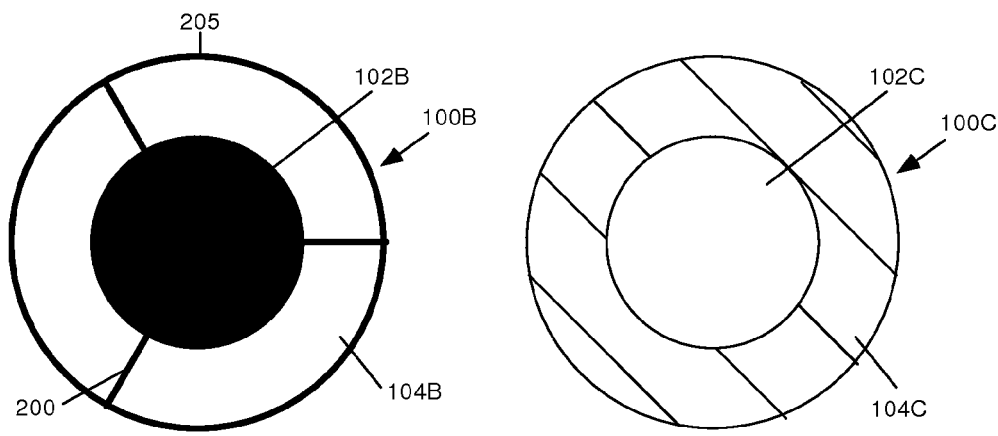
Fig. 2A--PRIOR ART              Fig. 2B--PRIOR ART

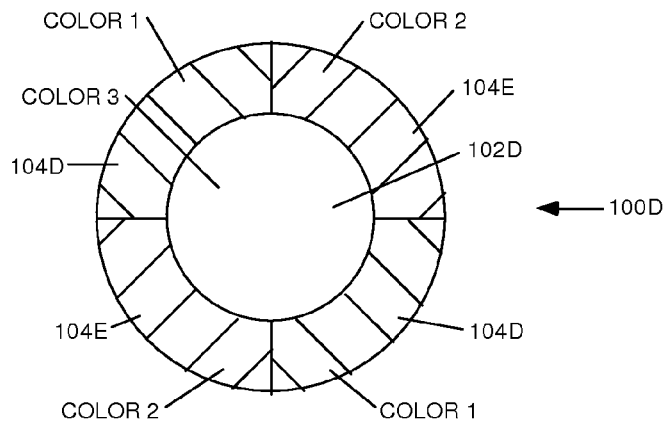
Fig. 3--PRIOR ART
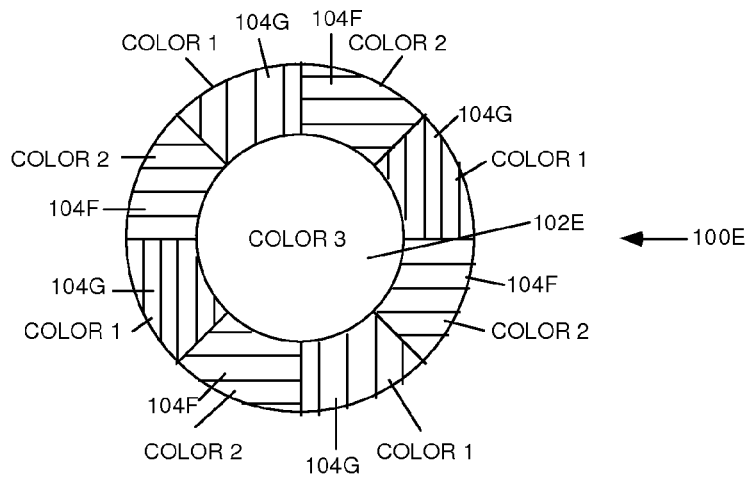
Fig. 4--PRIOR ART
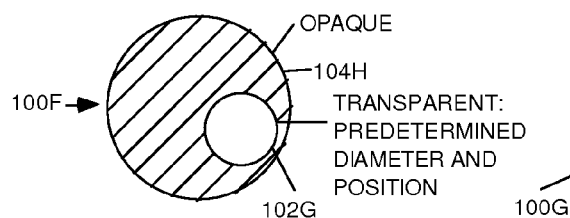
Fig. 5A--Prior Art
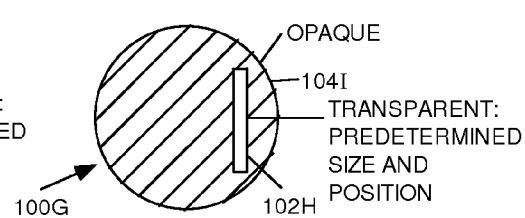
Fig. 5B--Prior Art

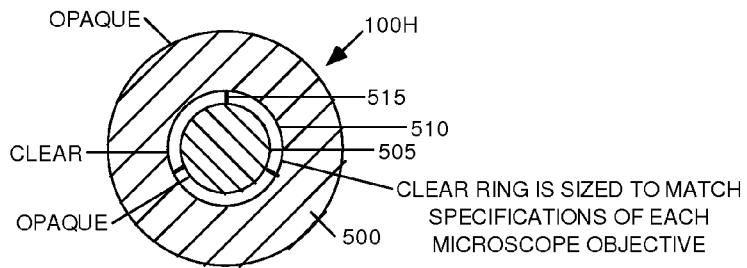
Fig. 5C--Prior Art
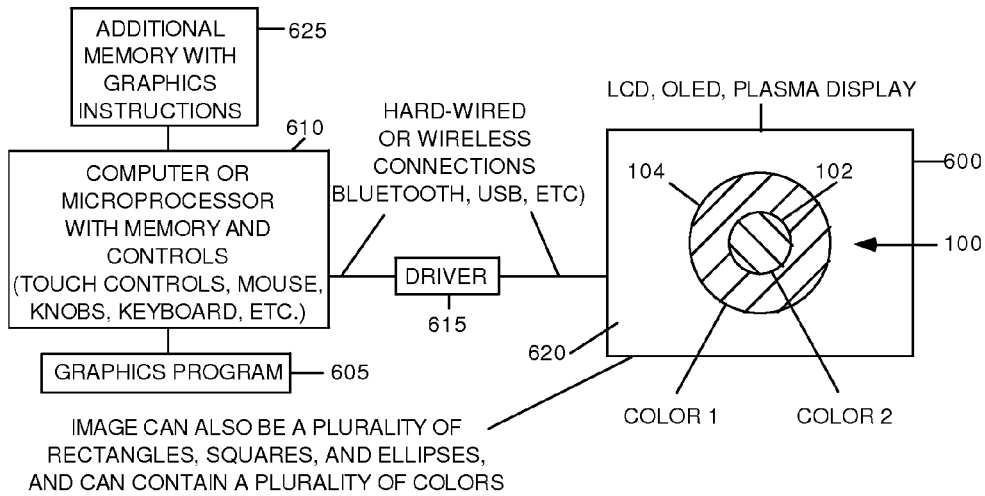
Fig. 6
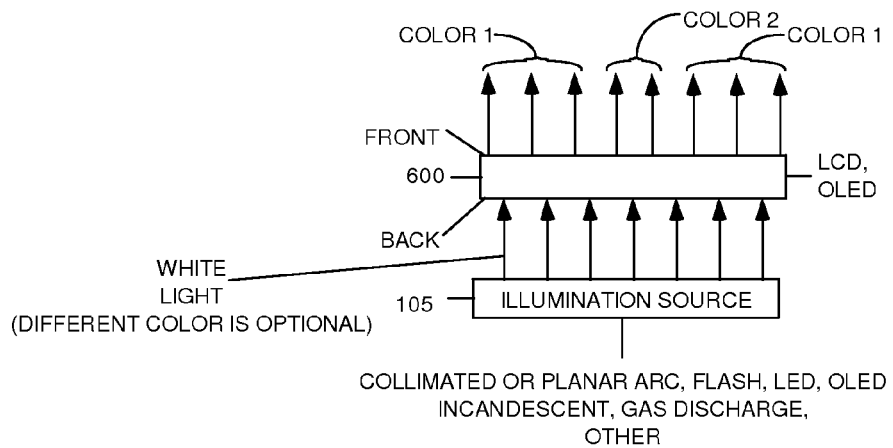
Fig. 7

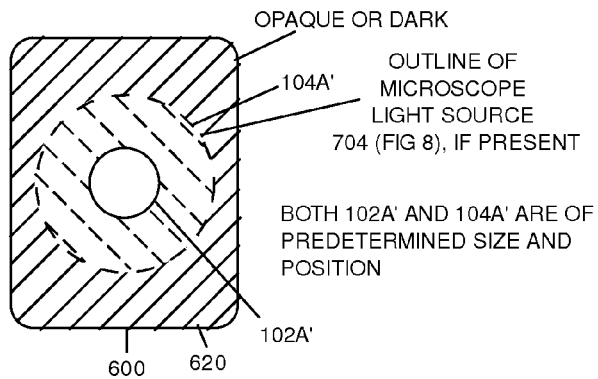
Fig. 10A--
DARK FIELD ILLUMINATION
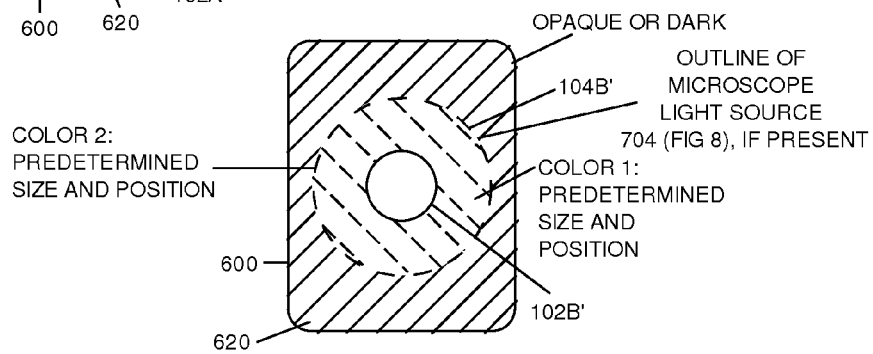
Fig. 10B--RHEINBERG ILLUMINATION
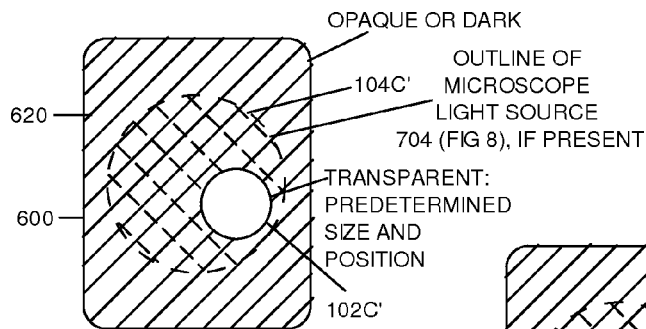
Fig. 10C--
OBLIQUE ILLUMINATION
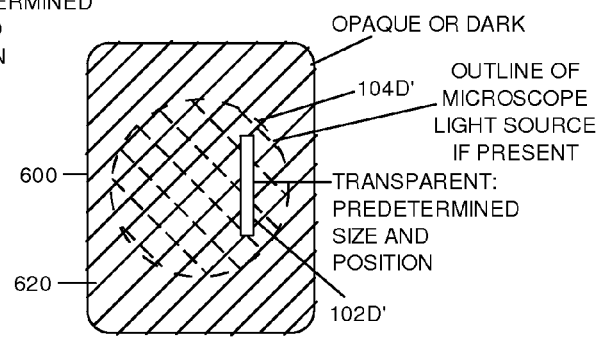
Fig. 10D--
OBLIQUE AND MODULATION
CONTRAST ILLUMINATION

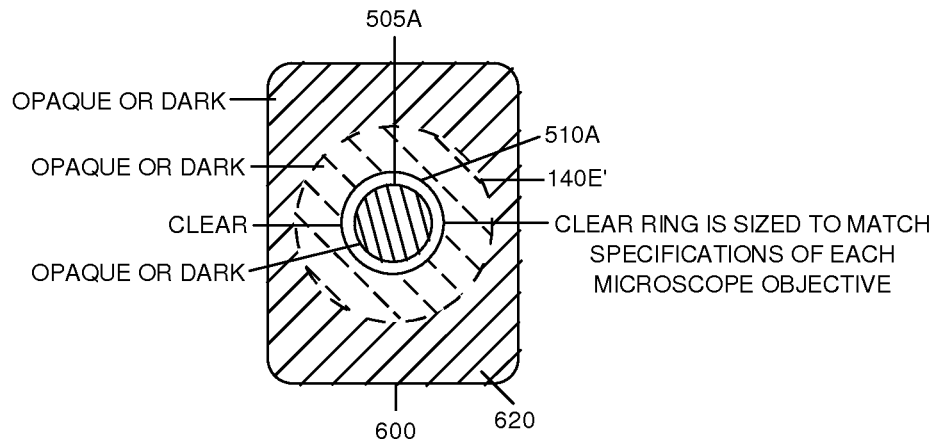
Fig. 10E--PHASE CONTRAST ILLUMINATION
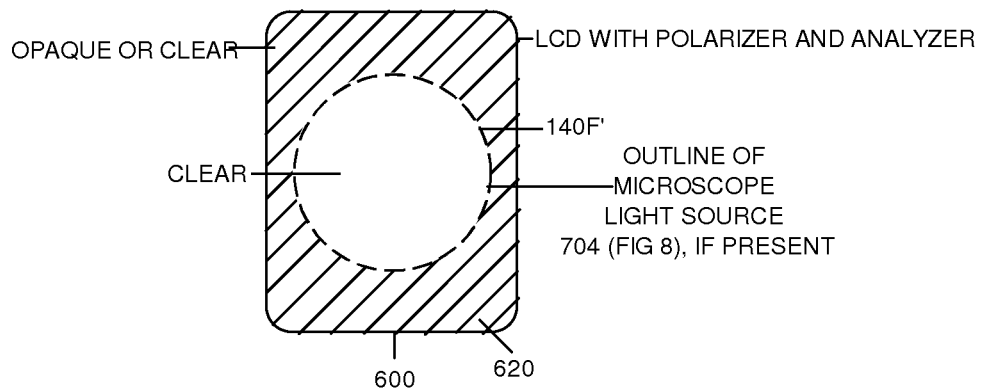
Fig. 10F--POLARIZED ILLUMINATION

ELECTRONICALLY VARIABLE ILLUMINATION FILTER FOR MICROSCOPY

CROSS-REFERENCE TO RELATED APPLICATION

This application claims priority of Provisional Patent Application Ser. No. 61/911,367, filed 3 Dec. 2013.

BACKGROUND

Prior Art—Diascopic Illumination—FIGS. 1 Through 5

Subjects examined with a microscope are illuminated using a variety of techniques. Two principal techniques are episcopic, i.e. reflected illumination, and diascopic, i.e. illumination that passes through a subject. Some specimens, for example protozoa such as amoebae, plant and animal cells, and the like are nearly transparent when viewed with ordinary bright field diascopic illumination. Light is only weakly absorbed in these translucent subjects so that they are not well-differentiated from the background light that illuminates them. In the past, various image contrast-enhancing techniques have been used to render these subjects visible and more easily studied. Dyes such as hematoxylin and eosin have been used to respectively stain the nuclei and cytoplasm of cells for improved visualization. A number of illumination and light processing techniques are also used to improve visualization without or in conjunction with staining of subjects. These include dark field, Rheinberg, oblique, monochrome, polarized, phase contrast, differential interference contrast, intensity modulation contrast, and other techniques.

Dark Field, Rheinberg, and Monochrome Diascopic Illumination—FIGS. 1 Through 4

In well-known dark field imaging, a central portion of the illuminating light is blocked from entering the objective lens of the microscope. The remaining light that enters the microscope objective is reflected, refracted, or transmitted by the subject being viewed. The result is a light image on a dark background.

Rheinberg illumination is a modification of dark field imaging. It is used to enhance contrast and appearance in subjects being examined with a microscope by using colors. In this technique, the central portion of the illuminating light is given a first predetermined color, instead of being blocked as in the case of dark field illumination. The remaining portion of the illuminating light, outside the central portion, can be white or given a second predetermined color. When viewing a subject, the viewer sees the subject in the second predetermined color on a background of the first predetermined color.

FIG. 1 shows a side view of a microscope's optical path including an illumination source 105, a condenser 110, and an objective lens 135, as modified for both conventional dark field and Rheinberg illumination. A multi-part filter 100A, comprising inner part 102A and outer part 104A, intercepts illumination, indicated by rays A, A', B and B', from illumination source 105. Rays A and A' pass through a portion 104A of filter 100A and rays B and B' pass through a portion 102A of filter 100A. The outer diameter of portion 104A of filter 100A is generally equal to or greater than the diameter of the light from illumination source 105. In fact, portion 104A does not have to be circular. It can be any shape so long as it completely covers the light beam supplied by source 105. The diameter of portion 102A of filter 100A is selected to intercept all direct light entering objective lens 135 of the microscope. The center of portion 102A is generally aligned with the central axis of objective 135, except in the case of oblique illumination, described below.

In the case of dark field illumination, portion 102A of filter 100A is normally black or opaque and portion 104A is normally transparent and clear. In the past, region 102A comprised a dark metal or plastic disc and region 104A was an air space. Portion 102A was supported by a plurality of narrow projections that extended through region 104A and then on to a mechanical support (not shown), forming a light-blocking disc that is well-known to those skilled in the art of microscopy.

Source 105 is generally a source of collimated, i.e. parallel, rays of white light indicated at 106, although other colors can be used. Light 106 from source 105 enters condenser 110 which comprises a plurality of lenses 115, 120, and possibly additional lenses. Light from condenser 110 provides a cone of illumination, indicated by the intersection of rays A, B, A', and B', at a subject 125 that is supported on a transparent supporting microscope slide 130.

Objective lens 135 is arranged to receive light from the vicinity of subject 125. Lens 135 passes light to the eyepiece of the microscope or a relay lens or a camera (not shown) in well-known fashion.

In dark field and Rheinberg illuminations, condenser 110 is arranged so that rays A and A' pass through subject 125, yet do not enter lens 135, while rays B and B' pass through subject 125 and do enter lens 135. The result is that rays B and B' provide background illumination and rays A and A' provide foreground illumination of subject 125.

FIGS. 2A and 2B show plan views of aspects of filters 100B and 100C. A first aspect shown in FIG. 2A is used in dark field microscopy. Filter 100B in FIG. 2A comprises a light blocking portion 102B, a light transmitting portion 104B, a plurality of struts 200 and an outer ring 205. Ring 205, struts 200, and portion 102A are coplanar and rigid. They are normally made of black metal or plastic with thickness of about 75-100 micron. Filter 100B is suspended at ring 205 by a mechanical support (not shown) at the same position shown for filter 100A (FIG. 1), in well-known fashion.

Filter 100C in FIG. 2B is used in Rheinberg illumination. It is generally made of transparent plastic or gelatin photographic color filter material. Outer portion 104C that illuminates the subject is made of a material of a first color, and inner portion 102C that provides background light is a second color. Inner portion 102C is secured into a cut-out portion of portion 104C, with the diameter of portion 102C being equal to the diameter of the cut-out portion of portion 104C. Thickness of portions 102C and 104C is normally between 75 and 100 micron.

FIGS. 3 and 4 show well-known variations on filters for Rheinberg illumination. FIG. 3 shows a filter 100D that comprises two alternating colors, color 1 and color 2, for subject illumination in regions 104D and 104E respectively, and one background color in region 102D. The background color in region 102D is color 3 in this example. Filter 100D can be used to illuminate a piece of fabric (not shown) that has crossed threads. With proper positioning of the sample, threads oriented in a first direction will appear as if illuminated by color 1, and threads oriented 90-degrees from the first direction will appear as if illuminated by color 2. The background illumination on which the fabric appears will have the color of region 102D, i.e. color 3, of filter 100D (including black, if that is the color of region 102D).

FIG. 4 shows an alternative filter 100E that comprises four alternating pairs of colored sections 104F and 104G in colors 1 and 2, and one background color, color 3, in region 102E. Many combinations are possible. The user selects one over the other based on the desired presentation of the subject being viewed.

When filter 100C (D, E) comprises a simple black circle in the center portion 102 and a clear outer region 104C (D, E), the Rheinberg filter is a dark field filter.

When regions 102C and 104C of filter 100C are the same color, or when region 102C is large enough to intercept all light from source 105, filter 100C is a monochrome filter. A monochrome filter is used to increase image contrast when examining subjects of a contrasting or complementary color.

Oblique Diascopic Illumination—FIGS. 5A and 5B

FIGS. 5A and 5B show filters 100F and 100G, respectively, that provide oblique, i.e. off-center, illumination. For this purpose, a transparent region 102G is located away from the central axis of objective 135 (FIG. 1). Light from source 105 is blocked from directly entering objective 135 by region 104H, while light passed through region 102G and condenser 110 illuminates subject 125 (FIG. 1) at an angle, or obliquely. Alternatively, regions 102G and 104H can be clear or colored, as described above in connection with Rheinberg illumination.

The illumination pattern in FIG. 5B is used with another oblique illumination method called Modulation Contrast illumination. This well-known method is ascribed to Robert Hoffman and is taught in a number of patents, including U.S. Pat. No. 4,062,619 (1977), U.S. Pat. No. 4,200,354 (1980), and others. Regions 102H and 104I are transparent and opaque, respectively. Additional apparatus, an objective lens with light modulating components, is required to realize this method of illumination. For simplicity, only the illumination source modifications are discussed here.

Phase Contrast Illumination—FIG. 5C

FIG. 5C shows one aspect of a filter 100H that is used in diascopic phase contrast illumination. Filter 100H comprises two opaque regions 500 and 505 and a central transparent ring 510. Region 505 is suspended in the plane of region 500 by a plurality of struts 515. Filter 100H is placed in condenser 110, as shown in FIG. 1, and passes light from source 105 to condenser 110 only via ring 510. Additional apparatus in an objective lens is required to realize this method of illumination. As above, only the illumination source modifications are discussed here.

Rheinberg, dark field, oblique, modulation contrast, phase contrast, and variations on these illumination methods provide alternatives to direct, bright field, illumination of sample 125 (FIG. 1). In many cases these alternatives provide greater contrast than bright field illumination. The obtainable benefits depend largely on the nature of sample 125 (FIG. 1) being studied. In the past, these various alternatives have seen limited use because of the need to make the filters and tailor them to the microscope, the magnification of the objective, the aperture of the condenser, and the colors required. If a microscope contains a plurality of objective lenses of different numerical apertures on a turret, changing lenses necessitates changing the diameter of regions 102, i.e. changing filters so that the various components of the filters, i.e. the areas that block and pass light, are sized properly for the objective in use.

SUMMARY

We have discovered a method and apparatus that will greatly simplify implementation and use of these various illumination techniques and provide all the prior-art capabilities in a single system without the necessity to change filters. Our apparatus uses an electronically controllable optical filter that can easily be configured on-the-fly to emulate all of the above illumination methods and more, including monochrome and polarized illuminations. Our apparatus and method replace the prior-art filter assemblies and provide all the above prior-art capabilities in a single unit. Each illumination method is quickly selectable with very little effort on the part of the user. In the present context, the term filter is used to identify apparatus or means that is interposed in a light beam and either blocks or passes light in predetermined patterns and colors.

DRAWING FIGURES

FIG. 1 shows a side view of elements of a prior-art microscope and a dark-field or Rheinberg filter.

FIG. 2A shows a plan view of a prior-art light block for dark field illumination.

FIGS. 2B through 4 show plan views of prior-art Rheinberg illumination filters.

FIGS. 5A and 5B show plan views of prior art light blocks for oblique illumination.

FIG. 5C shows a plan view of a prior art light block for phase contrast illumination.

FIGS. 6 and 7 show plan and side views respectively of schematic block diagrams of one aspect of an embodiment.

FIGS. 10A through 10F show the appearance of an illuminating source for various types of illumination.

DRAWING REFERENCE NUMERALS

Figure 8:
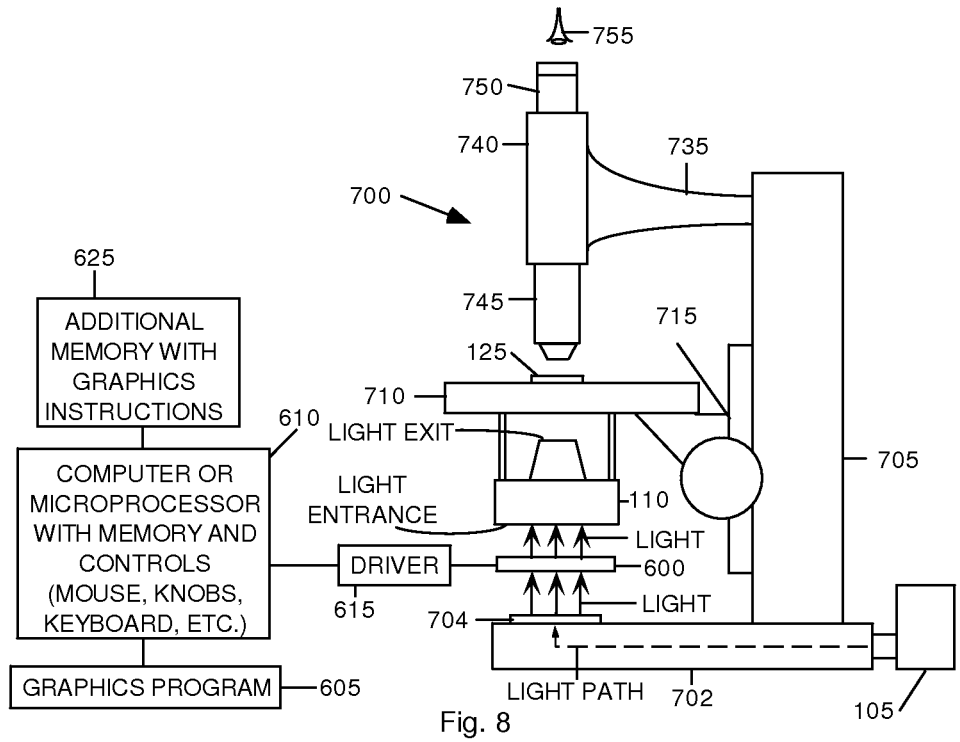
FIG. 8 shows a side view of an embodiment in place on a microscope.

100 Filter
102 Inner portion
104 Outer portion
105 Source
106 Light
110 Condenser
115 Lens
120 Lens
125 Subject
130 Slide
135 Objective lens
500 Region
505 Region
510 Ring
515 Strut
600 Display
605 Program
610 Computer
615 Driver
620 Region
625 Memory
700 Microscope
702 Base 704 Port
705 Column
710 Stage
715 Mechanism
735 Arm
740 Lens tube
745 Lens
750 Eyepiece
755 Observer
900-940 Blocks First Embodiment Electrically Variable Diascopic Filter Construction—FIGS. 6 and 7 Description FIGS. 6 and 7 show plan and side views, respectively, of an LCD display 600. Display 600 is the model DT024CTFT, manufactured by Displaytech Ltd., of Carlsbad, Calif., USA, although other displays can be used. A backlighting assembly (not shown) is normally secured to one side of the display so that a user can operate the display under most lighting conditions. In one aspect of the present embodiment, the backlighting assembly is removed from the display, thereby enabling use of a microscope's light source 105 (FIG. 1) wherein the microscope's light source shines through the display 600. A microscope's light source is collimated, whereas the backlighting assembly of a display is a planar source that is normally not collimated. The microscope's collimated source enables proper use of a microscope's condenser optics, is brighter, and introduces less undesirable scattered light than the display's planar source.

Display 600 is electronically driven in the same manner as a well-known computer display. In FIG. 6, a graphics program 605 contains instructions for a computer 610 such as a personal computer, a hand-held personal computing devices such as tablet, a smart phone, or a microprocessor that communicates with display 600 via a driver circuit 615. Driver 615 is an electronic interface that receives signals from computer 610 and converts them into signals that are sensible by display 600 and cause display 600 to display graphic images. The image comprising color elements 102 and 104 is generated in computer 610 by graphics program 605. Program 605 can also receive graphic images of filter 100 from other graphics programs such as PhotoShop, sold by Adobe Software, Inc. of San Jose, Calif., USA.

In addition to graphics program 605, an additional memory 625 connected to computer or microprocessor 610 contains instructions that activate driver 615 and cause display 600 to display predetermined shapes and colors. Program 605 and instructions stored in memory 625 can cause computer or microprocessor 610 to generate any predetermined image on display 600. For the purpose of describing one aspect of the present embodiment, program 605 and memory 625 generate the image shown in FIG. 6. They can also generate images as shown in FIGS. 1 through 5C and any others that may be desired, including a plurality of squares, rectangles, and ellipses, and alternative Rheinberg patterns such as shown in FIGS. 3 and 4. A first portion of an image can be brighter or dimmer than a second portion of an image.

FIG. 7 shows a side view of display 600 with an illumination source 105. Illumination source 105 can be an arc, flash, LED, OLED, incandescent, gas discharge, candle, sunlight, or any other source of light that is suitable for use with microscopy. Display 600 is preferably a color-type, transparent LCD, although a monochrome LCD can be used for dark field, oblique, and phase contrast illuminations. Instead of an LCD, display 600 can be an OLED (organic light-emitting diode) display, thereby eliminating the need for illumination source 105. The images shown in FIGS. 2A through 5C can be displayed on a light-emitting OLED display, for example.

In an aspect of the present embodiment in which display 600 is an LCD, light from source 105 enters the back side of display 600. Source 105 preferably provides collimated white light from an incandescent or arc-light (steady-state or flash) source, although other colors and sources can be used. Instead of a collimated source, source 105 can be a planar source such as used with flat panel displays found in cell phones and personal entertainment devices. The light can be provided by ordinary single-crystal, light-emitting diodes (LED), OLEDs, or plasma displays. An emissive OLED or plasma display can be used in place of the combination of an LCD and a planar light source.

As light from source 105 passes through display 600, it is altered according to instructions from graphics program 605, memory 625, and computer 610. The patterns 102 and 104 shown in FIG. 6 can be any size that can be displayed in display 600. Other shapes and sizes can be used as well.

Region 104 is normally large enough to fully illuminate a specimen 125 (FIG. 8). Display 600 is normally rectangular, leaving a possibly unused region 620 in display 600. Region 620 (FIG. 6) can be transparent, opaque, or any desired color that is determined by graphics program 605.

Computer 610, driver 615, display 600, and illumination source 105 all receive energizing power from one or more well-known standard sources (not shown) such as power mains and batteries.

Operation

FIGS. 8 Through 10E

FIG. 8 shows one aspect of the present embodiment properly located in the optical path of a typical optical microscope 700. Microscope 700 comprises a base 702, a vertical column 705, a stage 710, a mechanism 715 for raising and lowering stage 710 on column 705, a light source 105 that directs light through internal optics (not shown) within base 702 and out through a port 704 into the lower side of display 600, and a condenser 110 that focuses light on a subject 125 on stage 710. An arm 735, rigidly secured to stand 705, and lens tube 740 support an objective lens 745 and an eyepiece 750. An observer 755, indicated by an eye, peers downward through eyepiece 750 to view subject 125 on stage 710. Instead of an upright microscope as shown, a well-known tilted or inverted microscope can be used.

Display 600 is placed between port 704 and condenser 110 in place of filter 100A (FIG. 1). In one aspect, display 600 is secured against port 704. Alternatively, display 600 is secured between port 704 and condenser 110 or secured to condenser 110. If the light emanating from port 704 is collimated, the vertical placement of display 600 between port 704 and 110 is not critical since the filter effect of display 600 will be about the same at all positions because of the parallel-beam nature of collimated light. In the case of modulation contrast and phase contrast imaging, the vertical position of display 600 may need to be selected for optimization of these illumination techniques. Display 600 is rigidly held in place with respect to the light path of microscope 700 by a well-known filter holder or other apparatus (not shown).

Observer 755 operates program 605, memory 625, and computer 610 via a keyboard, mouse, touch screen, etc. to vary the size, color, and shape of regions 102, 104, and 620, as well as any additional shapes that are desired in display 600 (FIG. 6). These regions can individually assume any color or optical density (i.e. transmissivity) that is achievable by display 600 under instructions from program 605.

Figure 9:
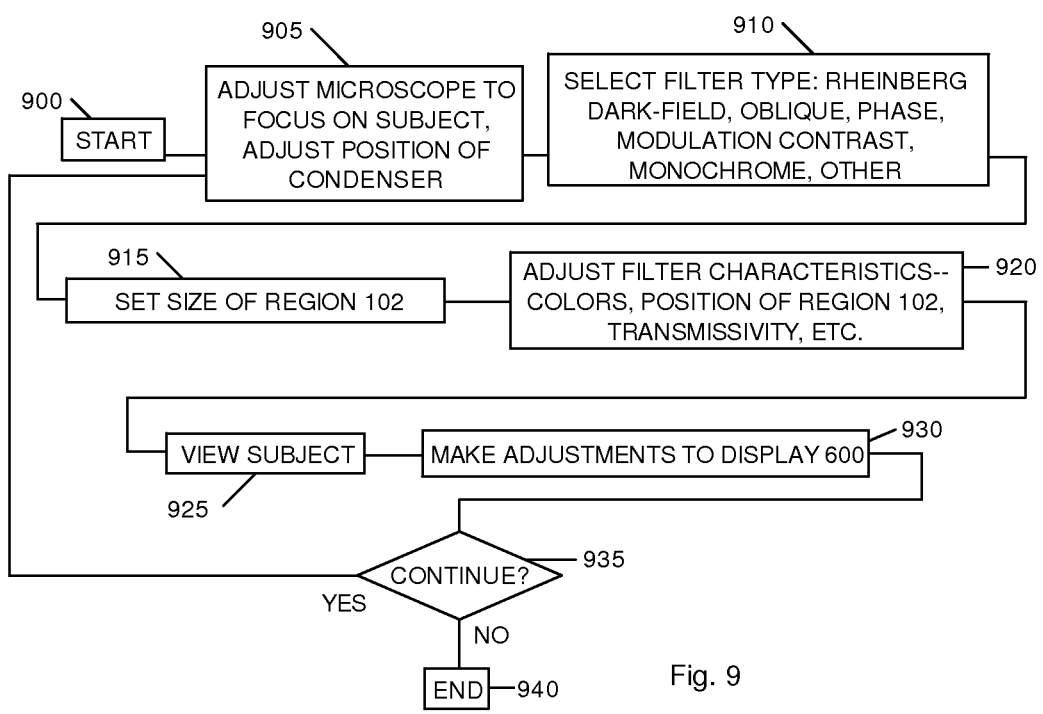
FIG. 9 is a flow chart showing steps taken in operation of one aspect of an embodiment.

FIG. 9 is a flow chart showing the steps in operating filter display 600. At the start, block 900, observer 755 (FIG. 7) connects, energizes, and activates computer 610, program 605, memory 625, driver 615, filter 600, and illuminator 105. Initially, display 600 is normally clear to facilitate set-up of microscope 700 for imaging specimen 125. Next, observer 755 adjusts microscope 700 to focus on subject 125, block 905. Using a mouse, keyboard, or other control (not shown), user 755 accesses program 605 and selects the type of diascopic filter to be displayed by display 600, block 910. Next, observer 755 sets the desired size of region 102 (FIG. 1, FIGS. 5A through 5E, etc.), block 915, and adjusts the colors, position of region 102, transmissivity (brightness of regions 102 and 104 as seen at objective 745), and any other desired parameters such as the number and position of regions 104, and so forth, block 920. The position of region 102 is normally centered on the axis of objective lens 745, except in the case of oblique illumination. Next, observer 755 views subject 125, block 925, and makes adjustments (size, shape, colors, brightness, etc. of images on display 600) to display 600 in order to optimize the appearance of subject 125, block 930. If observer 755 wishes to continue, the flow of activities returns to block 905; if not, the process ends at block 940.

FIGS. 10A through 10E show the appearance of display 600 in use. Each of the prior-art illumination methods is emulated in display 600 under the control of graphics program 605, computer 610, memory 625, and driver 615 (FIG. 6).

FIG. 10A shows display 600 configured for dark field operation. Region 104A' is clear or transparent while region 102A' is dark or opaque. Region 620 is dark.

FIG. 10B shows display 600 configured for Rheinberg or monochrome illumination. Region 104B' is set to display, i.e. transmit, color 1 and region 102B' displays, i.e. transmits, color 2. Region 620 is dark. Alternatively, region 620 can be the same color and intensity as region 104B' since light from port 704 (FIG. 8) just fills region 104B'. In monochrome illumination, regions 102B' and 104B' are the same color.

FIG. 10C shows display 600 configured for oblique illumination. Region 104C' and region 620 are dark or black and region 102C' is transparent. Region 102C' is sized and moved within region 104C' in order to change the angle at which light strikes specimen 125 (FIG. 1). In an alternative aspect, regions 102C' and 104C' assume predetermined colors for a combination of Rheinberg and oblique illuminations.

FIG. 10D shows display 600 configured for oblique and modulation contrast illuminations. Regions 104D' and 620 are dark or black and region 102D' is transparent and of predetermined size and position.

FIG. 10E shows display 600 configured for phase contrast illumination. Regions 140E', 505A, and 620 are dark or opaque. A clear or transparent ring 510A surrounds region 505A so that light passes through region 505A and is blocked by the rest of display 600. If display 600 is a light-emitting display, as discussed above, regions 140E', 505A, and 620 are dark.

FIG. 10F shows display 600 configured for polarized illumination. This configuration requires display 600 to emit polarized light. By virtue of its construction, well-known to those in the arts of LCD assembly and use, an illuminated LCD emits polarized light. If another type of display is used, such as an OLED, an external polarizer may be added between display 600 and condenser 110. In this configuration, region 140F' is clear or transparent and region 620 can be either opaque or clear. In order to reduce scattered light, region 620 is dark. Condenser 110 is fully illuminated by light source 105 when region 140F' is the same size as the outline of microscope light port 704 (FIG. 8).

Conclusion, Ramifications, and Scope

The embodiments shown of our improved illumination system combine a display device, control circuitry with software, and a light source in such a way that selectable illumination techniques are made available to the microscopist without the need for making and changing a plurality of filters. Fully adjustable and configurable Rheinberg, dark field, oblique, modulation contrast, phase contrast, monochrome, and other lighting filters are thus provided in a single device. There are numerous alternative constructions and methods of operation. For example, instead of a single display 600, a plurality of displays 600 can be stacked in order to increase the contrast available between regions 102 and 104. Instead of using the collimated beam of light from the microscope's illuminator, an illuminated flat panel light source or other type of lighting can be used. Instead of an LED display, an organic light-emitting diode (OLED) display can be used in place of the combination of light source 105 and display 600. Our filter device can be built into a microscope or supplied as an add-on unit. The device can include an internal power supply or be supplied with power from an external supply source. One or more of the connections between computer 610, driver 615, memory 625, and display 600 can be hard-wired, or instead of a hard-wired connection a wireless connection such as Bluetooth, a product of the Bluetooth Special Interest Group, of Kirkland, Wash., USA can be used. Computer 610 can store a plurality of predetermined images that are to be displayed on display 600 so that an operator can quickly choose a desired combination of shapes and colors by merely selecting a previously stored image. A previously stored plurality of illumination methods can be stored and then accessed seriatim so that a user can quickly see a subject in a variety of lighting conditions. Instead of displaying an image, display 600 can be cleared, i.e. be made transparent so that images can be compared with and without filters. Instead of circular patterns, square or rectangular patterns can be used. These are well-known to those familiar with Rheinberg illumination. Light leaving the front of an LCD display (600 in FIG. 7) is polarized. An analyzer placed in the optical path above specimen 125 permits viewing of the specimen in polarized light.

While the present system employs elements which are well known to those skilled in the art of optics, it combines these elements in a novel way which produces one or more new results not heretofore discovered. Accordingly the scope of this invention should be determined not by the embodiments illustrated, but by the appended claims and their legal equivalents.

The invention claimed is:

1. An electronically controllable optical filter system for use in microscopy, comprising:

a computer, wherein said computer has activatable controls,
a memory connected to said computer,
a program of instructions operable within said computer and said memory for controlling the operation of said computer,
a display driver connected to said computer,
a display for emitting colored light and connected to said display driver,
said display driver being arranged to cause said display to display a predetermined plurality of graphic images that are selectable by said computer,
said computer being arranged to select said graphic images from said program or said memory according to a predetermined set of criteria,
a microscope having a light source and a condenser for illuminating a subject,
means for securing said display between said light source and said condenser of said microscope,
whereby when said light source is activated and said display is activated and secured between said light source and said condenser of said microscope, and said controls cause said display to display said predetermined images, said display causes said subject to be illuminated according to said predetermined graphic images in said display.

2. The system of claim 1 wherein said computer is selected from the group consisting of personal computers, hand-held personal computing devices, and microprocessors.

3. The system of claim 1 wherein said predetermined graphic images contain a plurality of colors.

4. The system of claim 1 wherein said display is selected from the group consisting of transmissive color liquid crystal displays and transmissive monochrome liquid crystal displays.

5. The system of claim 1 wherein said display is selected from the group consisting of light-emitting liquid crystal displays, light-emitting plasma displays, and organic light-emitting diode displays.

6. The system of claim 1 wherein said filter system emulates illumination methods selected from the group consisting of bright field, dark field, Rheinberg, oblique, monochrome, polarized, phase contrast, and modulation contrast illumination methods.

7. A method for providing illumination techniques for use in microscopy, comprising:
providing a microscope, said microscope including a condenser and a light source that emits light,
providing a subject to be examined using said microscope,
providing a computer with activatable controls,
providing a memory connected to said computer,
providing a program of instructions responsive to said controls and operable within said computer and said memory for controlling the operation of said computer,
providing a display driver connected to said computer,
providing a display for emitting colored light and connected to said display driver,
said display driver being arranged to cause said display to display a predetermined plurality of graphic images that are selectable by said computer,
said computer being arranged to select said graphic images from said program or said memory according to a predetermined set of criteria,
positioning said display between said light source and said condenser so that when said display is activated, said light from said light source passes through said images on said display and enters said condenser, and
activating said computer, said memory, said program, said display, and said display driver, and causing said computer to generate a predetermined image using either an image stored in said memory or causing said program to generate a predetermined image, wherein said computer passes said image to said display driver and said display driver causes said display to display said image,
whereby when said light passes through said images on display, said condenser causes said subject to be illuminated according to said predetermined graphic images in said display.

8. The method of claim 7 wherein said computer is selected from the group consisting of personal computers, hand-held personal computing devices, and microprocessors.

9. The method of claim 7 wherein said display is selected from the group consisting of color liquid crystal displays, monochrome liquid crystal displays, organic light-emitting diode displays, and plasma displays.

10. The method of claim 7 wherein said illumination techniques emulate illumination methods selected from the group consisting of bright field, dark field, Rheinberg, oblique, monochrome, polarized, phase contrast, and modulation contrast illumination methods.

11. The method of claim 7 wherein said predetermined graphic images contain a plurality of colors.

12. The method of claim 7 wherein said predetermined graphic images contain a combination of illumination methods selected from the group consisting of bright field, dark field, Rheinberg, oblique, monochrome, polarized, phase contrast, and modulation contrast illumination methods.

13. The method of claim 7 wherein said predetermined graphic images comprise shapes selected from the group consisting of rectangles, squares, circles, and ellipses.

14. An electronically controllable light source for illuminating a subject for viewing with a microscope, comprising:
a computer having a plurality of activatable controls,
a memory connected to said computer,
a program of instructions operable within said computer and said memory for controlling the operation of said computer,
said computer being responsive to said controls,
a display driver connected to said computer,
an optically emissive display connected to said display driver,
said display driver being arranged to cause said display to display a predetermined plurality of graphic images that are selectable by said computer,
said computer being arranged to select said graphic images from said program or said memory,
a condenser for said microscope,
said condenser being positioned to receive light containing said graphic images from said display and focusing said light on a subject,
whereby when said optically emissive display is activated, and said controls cause said display to display said predetermined images, said emissive display causes said subject to be illuminated according to said predetermined graphic images in said display.

15. The system of claim 14 wherein said computer is selected from the group consisting of personal computers, hand-held personal computing devices, and microprocessors.

16. The system of claim 14 wherein said predetermined graphic images contain a plurality of colors.

17. The system of claim 14 wherein said light emissive display is selected from the group consisting of liquid crystal displays, plasma displays and organic light-emitting diode displays.

18. The system of claim 14 wherein said light emissive display emulates illumination methods selected from the group consisting of bright field, dark field, Rheinberg, oblique, monochrome, polarized, phase contrast, and modulation contrast illumination methods.

* * * * *